Jan. 14, 1958 W. P. BENNETT 2,820,176

TUNABLE CAVITY RESONATOR

Filed Sept. 22, 1955

INVENTOR.
WILFRED P. BENNETT
BY Carl V. Olson
ATTORNEY

United States Patent Office 2,820,176

Patented Jan. 14, 1958

2,820,176

TUNABLE CAVITY RESONATOR

Wilfred P. Bennett, Lancaster, Pa., assignor to Radio Corporation of America, a corporation of Delaware Application September 22, 1955, Serial No. 535,845

The terminal fifteen years of the term of the patent to be granted has been disclaimed 8 Claims. (Cl. 315—41)

This invention relates to a tunable cavity resonator including a gaseous or liquid fluid, and more particularly to a tunable input or output cavity resonator circuit for a vacuum tube wherein tuning is accomplished by varying the pressure difference of the fluid on both sides of a tuning element in the cavity resonator.

The amount of power which can be obtained from an ultra-high frequency amplifier, such as may be employed in a television or radar transmitter, is often limited by arcing between points in the cavity resonator circuit across which high potential differences exist. It may be impossible to increase the mechanical clearances enough to avoid arcing at the desired high power output level because the physical dimensions of a cavity for use at ultra-high frequencies must be kept small for electrical reasons. The power handling capacity of a resonant cavity, such as the output cavity resonator circuit of a vacuum tube, can be increased by pressurizing the cavity. If the cavity is pressurized, conventional constructions for tuning the cavity are not suitable.

A general object of this invention is to provide an improved pressurized and tunable cavity resonator construction having high power handling capacity.

Another object is to provide an improved tunable vacuum tube input or output circuit having very high power handling capacity.

A construction illustrative of the invention comprises a coaxial line resonant cavity having one end sealed by connection to the electrode contact rings of a vacuum tube, and having the other end sealed by an end wall. The cavity resonator may be coupled to the output electrodes of the vacuum tube for use as the output circuit of the vacuum tube. An output coupling from the cavity resonator is arranged to include a pressure seal. Tuning of the cavity resonator is accomplished by means of an axially movable tuning element in the cavity resonator. A compressed gas from a source is applied thru conduits to opposite sides of the tuning element in the cavity resonator. The tuning element is moved by varying the pressure on the two sides of the tuning element. After the cavity resonator is accurately tuned to the desired frequency, the gas pressures on both sides of the tuning element are equalized and the resonant cavity is maintained under gas pressure to increase the power handling capacity of the cavity. An insulating liquid may be employed in place of gas.

These and other objects and aspects of the invention will appear from the following more detailed description taken in conjunction with the appended drawing, wherein.

Figures 2, 3:
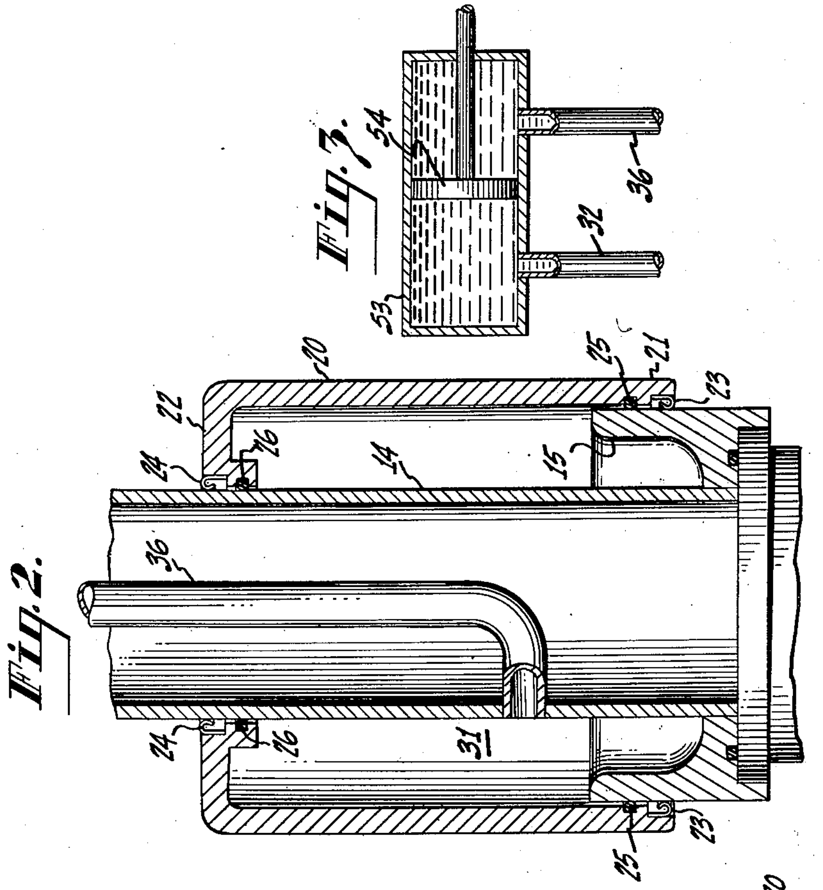
Figure 2 is an enlarged fragmentary view of the system of Figure 1 illustrating constructional details of the axially movable tuning element.
Figure 3 illustrates a source of hydraulic pressures which may be substituted for the source of compressed gas in the system of Figure 1.
Figure 1:
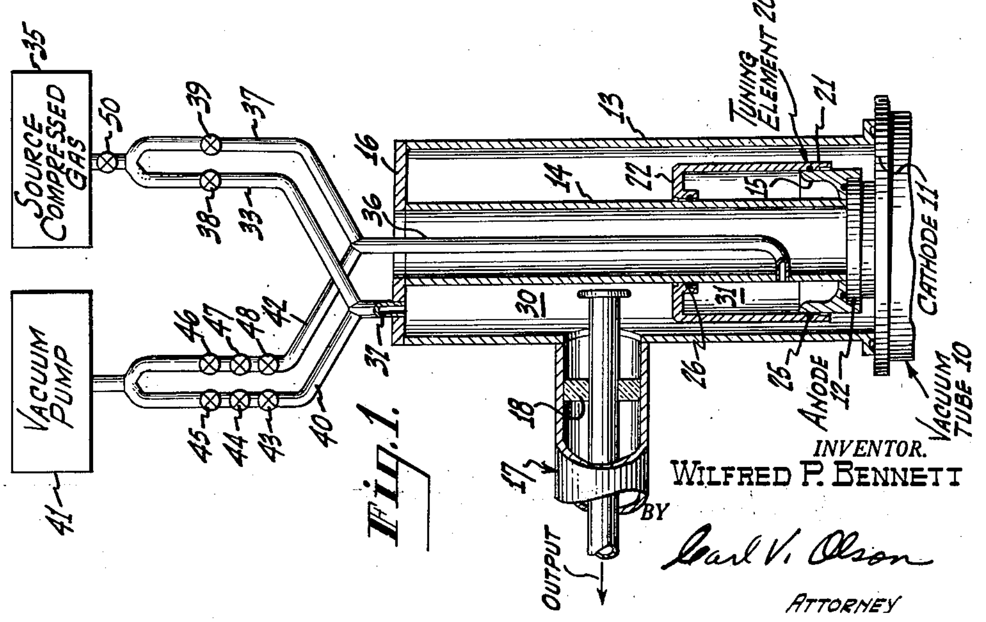
Figure 1 is a representation of a vacuum tube output circuit constructed according to the teachings of this invention.

The vacuum tube output circuit shown in Figures 1 and 2 of the drawings includes a vacuum tube 10 having a cathode contact ring 11 and an anode contact ring 12. A coaxial line cavity resonator includes an outer conductor 13 connected to the cathode contact ring 11 thru a pressure seal connection, and a coaxial inner conductor 14 connected to the anode contact ring 12 thru a flange 15 and a pressure seal. The end of the cavity resonator remote from the vacuum tube 10 is closed by an end wall 16. A radio frequency by-passing and direct current isolating capacitor (not shown) should be included at some point in the circuit to prevent a direct current path between the cathode 11 and anode 12. By way of example only, the by-pass capacitor may be located between the anode 12 and the assembly including conductor 14 and flange 15. Radio frequency energy is coupled from the cavity resonator by means of an output coaxial line 17 provided with an insulating pressure seal 18.

The cavity resonator is tuned by means of a tuning element 20 which is arranged for axial movement in the resonant cavity. The tuning element 20 illustrated in the drawing is a generally cup-shaped metallic element having a lip 21 arranged for sliding engagement with the flange 15, and having an aperture in the end wall 22 with an edge arranged for sliding engagement with the inner conductor 14 of the cavity resonator. The constructional details are shown in greater detail in Figure 2 of the drawings where it will be seen that sliding electrical contact is maintained by means of metallic spring fingers 23 and 24 and a sliding pressure seal is maintained by means of flexible plastic O rings 25 and 26. The tuning element 20 cooperates with the adjacent portion of the outer conductor 13 of the cavity resonator to provide a section of relatively low impedance transmission line which is adjustable in position to effect electrical tuning of the cavity resonator. The cavity resonator may, for example, have a total electrical length of three-quarters of a wavelength at the operating frequency. The tuning element 20 may have an axial length on the order of a quarter-wavelength at the operating frequency.

It will be noted from Figure 1 of the drawings that the space between the outer and inner conductors 13 and 14 of the cavity resonator is divided by tuning element 20 into two cells designated 30 and 31. The cell 30 is connected by conduits 32 and 33 to a source 35 of compressed gas; and cell 31 is connected by conduits 36 and 37 to the source 35 of compressed gas. Valves 38 and 39 are provided in the conduits 33 and 37, respectively. A common valve 50 is also provided.

Cell 30 is also connected by conduits 32 and 40 to a vacuum pump 41; and cell 31 is also connected by conduits 36 and 42 to the vacuum pump 41. A plurality of valves 43 thru 46 are provided in the conduits 40 and 42.

In the operation of the system of Figure 1, coarse tuning is performed by operating the valves 38, 39, and 43 thru 46 to effect movement of the tuning element 20 and thereby tune the cavity resonator to the desired operating frequency. If it is desired to move the tuning element 20 upwardly, the valves are operated to make the pressure in the cell 31 greater than the pressure in the cell 30. To move the tuning element 20 downwardly, the pressure differential is reversed.

The source 35 of compressed gas should preferably provide a gas such as sulphur hexafluoride which has a relatively high ionization potential. The vacuum pump 41 is employed to exhaust the air from the cells 30 and 31 of the cavity resonator prior to the insertion of gas from the source 35. Air is exhausted from the cavity resonator by closing valve 50, and by opening valves 43 thru 48. After the cavity resonator is exhausted, valves 43 thru 48 are closed, and valves 38, 39 and 50 are opened to apply gas under equal pressure to both of the cells 30 and 31. Then valves 38 and 39 are closed. Fine tuning is then accomplished by operating the valves 43 thru 48. For example, if it is desired to move the tuning element 20 a small amount in the upward direction, the valve 43 is opened to reduce the pressure in the cell 30 by an amount determined by the volume in conduit 40 between the valve 43 and 44. The reduction in pressure in the cell 30 results from the fact that the section of conduit between valves 43 and 44 was previously evacuated. An additional upward movement of the tuning element 20 may be accomplished by opening valve 44. Similarly, the tuning element 20 may be moved downwardly in small amounts by operating valves 48 and 47 to reduce the pressure in cell 31. After the tuning operation is completed, the valves 38 and 39 are opened to equalize the pressures in cells 30 and 31. The mechanical friction between the tuning element 20 and the contacted surfaces 14 and 15 maintains the tuning element 20 in its set position.

Figure 3 illustrates a hydraulic device for use in place of the compressed gas and vacuum devices in the system of Figure 1. A hydraulic cylinder 53 and cooperating piston 54 provide hydraulic pressures to conduits 32 and 36 in the system of Figure 1. According to this alternate form of the invention, the cylinder 53, the conduits 32 and 36, and the cells 30 and 31 are filled with an insulating liquid such as oil. Movement of the piston 54 varies the hydraulic pressures in the cells 30 and 31 to cause an axial movement of the tuning element 20. The insulating liquid in the cavity resonator permits operation at much higher powers without electrical arcing than can be obtained with air in the cavity resonator.

What is claimed is:

1. A tunable circuit comprising a sealed cavity resonator having walls; a movable tuning element in said resonator and having sliding pressure seals with the walls of said resonator; a source of fluid, two conduits from said source of fluid to respective opposite sides of said tuning element in said cavity resonator, and means to vary the fluid pressures differentially in said two conduits to move said tuning element.

2. A tunable energy-transferring circuit for a vacuum tube comprising a sealed cavity resonator having walls coupled to two electrodes of said vacuum tube; a movable tuning element in said resonator and having sliding pressure seals with the walls of said resonator, a source of fluid, two conduits from said source of fluid to respective opposite sides of said tuning element in said cavity resonator, and means to vary the fluid pressures differentially in said two conduits to move said tuning element.

3. A vacuum tube circuit comprising a vacuum tube, a coaxial line cavity resonator having inner and outer conductors sealed at one end by a connection to said vacuum tube and sealed at the other end by an end wall; a tuning element positioned between said coaxial conductors and adapted for axial movement in said resonator, said tuning element having sliding pressure seals engaging at least one of said conductors; a source of fluid, two conduits connected from said source of fluid to respective opposite sides of said tuning element, and means to vary the pressure difference in said conduits.

4. A vacuum tube circuit comprising a vacuum tube, a coaxial line cavity resonator having inner and outer conductors sealed at one end by a connection to said vacuum tube and sealed at the other end by an end wall; a tuning element positioned between said coaxial conductors and adapted for axial movement in said resonator, said tuning element dividing the cavity into two cells and having sliding pressure seals engaging at least one of said conductors; a source of fluid, two conduits connected from said source of fluid to said respective cells, and means to vary the pressure difference in said conduits.

5. A vacuum tube circuit comprising a vacuum tube, a coaxial line cavity resonator having inner and outer conductors sealed at one end by a connection to said vacuum tube and sealed at the other end by an end wall; a tuning element positioned between said coaxial conductors and adapted for axial movement in said resonator, said tuning element having sliding pressure seals engaging at least one of said conductors; a source of compressed gas, two conduits connected from said source of compressed gas to respective opposite sides of said tuning element, a vacuum pump, two conduits connected from said vacuum pump to respective opposite sides of said tuning element, and valves in said conduits to control the pressure difference on the two sides of said tuning element.

6. A tunable energy-transferring circuit for a vacuum tube comprising a sealed cavity resonator having walls coupled to two electrodes of said vacuum tube; a movable tuning element between said walls and forming two cells therein, said tuning element having sliding pressure seals with the walls of said resonator, a source of compressed gas, a source of vacuum, conduits connecting both said source of compressed gas and said source of vacuum to both of said cells, and valves in said conduits to control the pressure difference in said two cells, to thereby move said tuning element.

7. A tunable energy-transferring circuit for a vacuum tube comprising a sealed cavity resonator having walls coupled to two electrodes of said vacuum tube; a movable tuning element in said resonator and having sliding pressure seals with the walls of said resonator; a source of compressed gas, two conduits from said source of gas to respective opposite sides of said tuning element in said resonator, and means to vary the gas pressures differentially in said two conduits to move said tuning element.

8. A tunable energy-transferring circuit for a vacuum tube comprising a sealed cavity resonator having walls coupled to two electrodes of said vacuum tube; a movable tuning element in said resonator and having sliding pressure seals with the walls of said resonator; a source of hydraulic liquid, two conduits, from said source of liquid to respective opposite sides of said tuning element in said resonator, and means to vary the liquid pressures differentially in said two conduits to move said tuning element.

References Cited in the file of this patent

UNITED STATES PATENTS

| | | |
|---|---|---|
| 2,095,981 | Hansell | Oct. 19, 1937 |
| 2,492,811 | Guarrera | Oct. 28, 1947 |